Feb. 2, 1965 T. L. FAWICK 3,167,935
DOUBLE CHAIN AND SPROCKET COUPLING
Original Filed Sept. 7, 1962
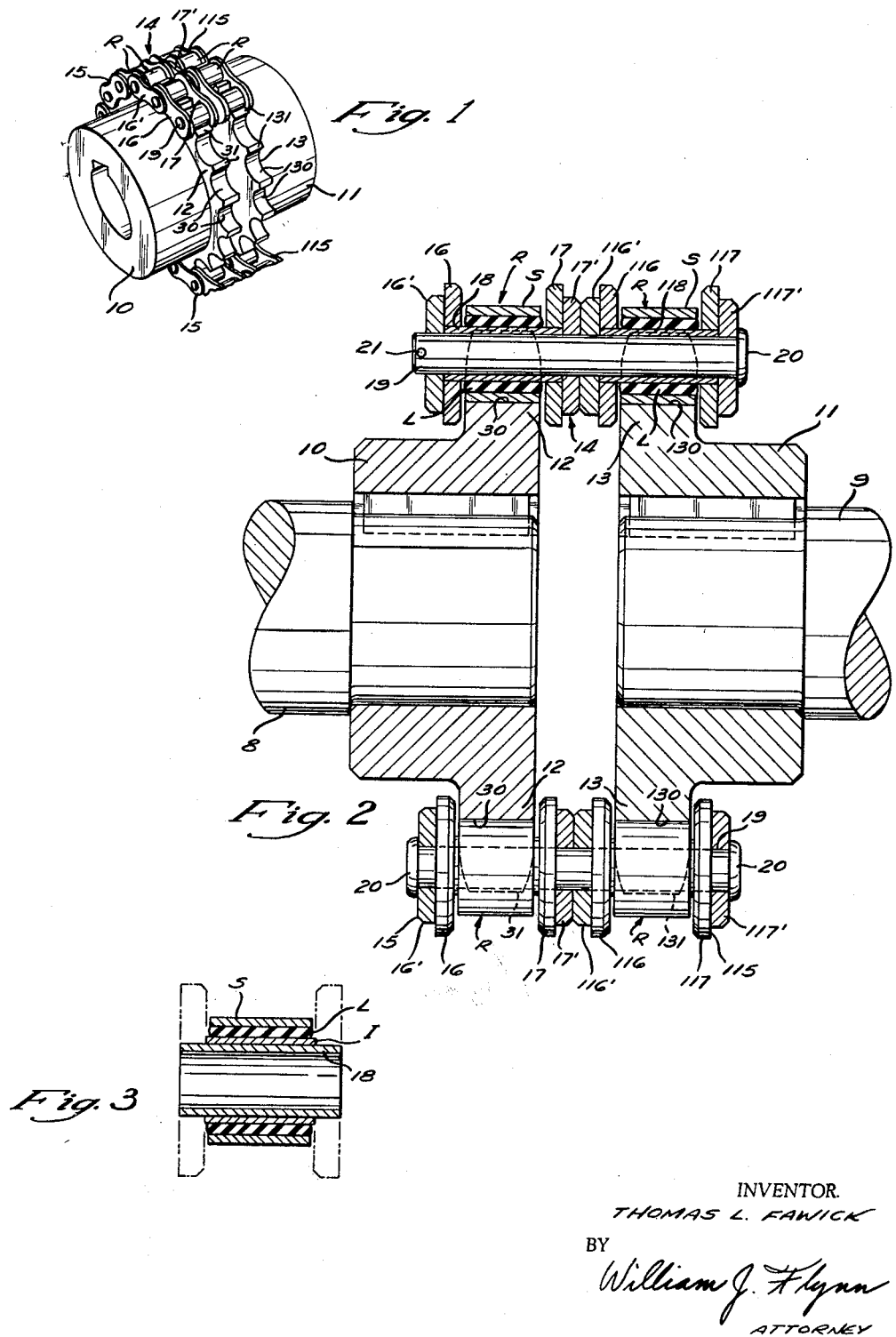
INVENTOR.
THOMAS L. FAWICK
BY
William J. Flynn
ATTORNEY

United States Patent Office 3,167,935
Patented Feb. 2, 1965

3,167,935
DOUBLE CHAIN AND SPROCKET COUPLING
Thomas L. Fawick, Shaker Heights, Ohio
(Hotel Statler-Hilton, Cleveland 14, Ohio)
Original application Sept. 7, 1962, Ser. No. 222,044.
Divided and this application Dec. 23, 1963, Ser. No. 332,718
4 Claims. (Cl. 64—19)

This application is a division of my co-pending application, Serial No. 222,044, filed September 7, 1962, now abandoned.

This invention relates to an improved double chain and sprocket coupling, in which two rotatable sprockets, disposed closely adjacent one another in approximate axial alignment, are interconnected by a double chain. Prior to the present invention couplings of this type had very little flexibility and substantially no torsional resilience to accommodate axial misalignment of the two sprockets.

The present invention is directed to a novel and improved arrangement which overcomes these and other disadvantages of such double sprocket and chain couplings.

Accordingly, it is a principal object of the present invention to provide a novel and improved double sprocket and chain coupling having greater flexibility and having substantial torsional resilience.

Further advantages of this invention will be apparent from the following description of certain presently-preferred embodiments thereof, which are shown in the accompanying drawing.

In the drawing:

FIGURE 1 is a perspective view of a double chain and sprocket coupling which incorporates the present invention, with the double chain partly broken away for clarity;

FIGURE 2 is an axial section on an enlarged scale through the FIG. 1 coupling and showing resilient rollers in the chain thereof, in accordance with a first embodiment of the present invention; and FIGURE 3 is an enlarged fragmentary axial section showing a second embodiment of the resilient rollers for incorporation in the chain of the FIG. 1 coupling.

Referring first to FIG. 1, the flexible coupling shown there is of the known double sprocket and chain type. It includes a pair of axially spaced, separate collars 10 and 11 adapted to be fastened respectively to a rotatable driving shaft 8 (FIG. 2) and to a rotatable driven shaft 9. At their adjacent ends these collars have rigid, integral sprockets 12 and 13, respectively, which are spaced axially a short distance. An endless double chain 14 fits snugly on both sprockets around the complete peripheral extent of each sprocket. This double chain couples the two sprockets to one another, so that rotation of the driving shaft 8 will be imparted to the driven shaft 9.

Prior to the present invention such double chains have been constructed entirely of metal. As a consequence, the only flexibility in the coupling was just the limited amount permitted by the "play" between each chain and its sprocket. This was not entirely satisfactory if the respective axes of the shafts were misaligned or if the coupling was subjected to substantial shock loading.

In accordance with the present invention the performance of double sprocket and chain couplings of this general type may be significantly improved as to both flexibility and resiliency.

Referring to FIGS. 1 and 2, the double chain 14 comprises an interconnected pair of endless chains 15 and 115, which fit respectively on the sprockets 12 and 13.

The chain 15 is made up of alternate wide and narrow links, pivotally interconnected in succession, each including a pair of flat, parallel side pieces disposed respectively on opposite sides of the sprocket 12. The narrow links in FIGS. 1 and 2 have these side pieces designated by the reference numerals 16 and 17. The wide links have these side pieces designated by the reference numerals 16' and 17'. For a part of their extent the ends of successive links interfit, one within the other, with the side pieces 16' and 17' on the wide link being disposed just outside the corresponding side pieces 16 and 17 on the narrow link. At each such location the narrow link has a cylindrical bushing 18 (FIG. 2) attached to and extending between its opposite side pieces 16 and 17.

The other chain 115 is of identical construction, the corresponding elements having the same reference numerals as those on chain 15, plus 100.

At each location where the successive chain links interfit there is provided a rigid cross shaft or pintle 19 (FIG. 2) which pivotally interconnects the successive links in each chain, as well as rigidly interconnecting the two chains 15 and 115. Each of these cross shafts 19, except one, is constructed as shown at the bottom of FIG. 2, presenting enlarged heads 20 at its opposite ends disposed respectively at the outside of the outer side piece 117' on the respective wide link of chain 115 and at the outside of the outer side piece 16' on the respective link of chain 15. Each such cross shaft provides a permanent rigid connection between the two chains.

The remaining cross shaft 19, shown at the upper end of FIG. 2, is removable so that the ends of the double chain may be readily interconnected or detached from each other to facilitate the assembly of the double chain onto the sprockets or its disassembly from the sprockets. The shank of this last-mentioned shaft 19 extends from an enlarged head 20 at its right end through the wide link side piece 117', through the bushing 118 attached to the side pieces 117 and 116 of the narrow link on this chain, through the opposite side piece 116' of the wide link on the chain 115, through the adjacent side piece 17' of the wide link on chain 15, through the bushing 18 attached to the side pieces 17 and 16 of the narrow link on chain 15, and through the opposite side piece 16' on the wide link of this chain. This particular cross shaft 19 is maintained in assembled relation to the respective chain links by means of a retainer 21 extending through a diametrical opening in the cross shaft at the outside of the side piece 16'.

The other cross shafts 19 extend through the bushings 18 and 118 on the narrow links of the two chains in the same fashion as shown at the lower end of FIG. 2. Each such bushing is rotatable on the respective cross shaft or pintle 19, so that the respective adjoining links in each chain can pivot easily with respect to one another.

In accordance with the present invention each chain in the double chain is provided with rollers R of novel construction which fit in the rounded recesses 30, 130 between successive teeth 31 and 131 on respective sprockets 12 and 13.

FIGURE 2 shows one embodiment of these rollers R. In this embodiment each roller consists of an outer cylindrical metal sleeve S, which engages the sprocket, and a cylindrical inner bushing or liner L of vulcanized soft rubber or rubber-like material having equivalent characteristics of deformability and resilience, which engages the bushing 18 or 118 on the corresponding chain. The inner bushing or liner L on each roller preferably is bonded, such as by vulcanized adhesion, to the inside of the metal sleeve S. This inner liner is both deformable and resilient. Because of these characteristics the flexibility of the coupling is greatly enhanced. A greater degree of misalignment of the driving and driven shafts is permissible because of the ability of the rubber-like liners in the rollers to flex or deform sufficiently to accommodate such misalignment. The axial length of each roller R is less than the spacing between the side pieces 16 and 17, or 116 and 117, of the respective narrower link of the chain. This permits the roller to flex or twist about an axis extending transverse to its own longitudinal axis without binding against the side pieces of the chain. Furthermore, the resilience of these liners cushions the coupling, providing torsional resilience which was previously completely absent from couplings of this general type. As a consequence the coupling is better able to operate under heavy loads, and particularly shock loading, without excessive friction or noise.

FIGURE 3 shows an alternative embodiment of the rollers which differs from the embodiment of FIG. 2 only by the addition of an inner metal bushing or sleeve I at the inside of the rubber bushing L. This inner bushing I facilitates the replacement of a roller on the chain in the field. The roller embodiment of FIG. 3, when incorporated in the coupling, provides the same improvements in flexibility and resilience as the FIG. 2 embodiment.

While certain presently-preferred embodiments of this invention have been shown and described, it is to be understood that various modifications, omissions and refinements which depart from the disclosed embodiments may be adopted without departing from the spirit and scope of the present invention.

I claim:

1. A double chain and sprocket coupling comprising first and second rigid, separate, rotatable sprockets positioned axially adjacent one another and in approximate axial alignment, each sprocket having alternate teeth and recesses in its periphery, a first endless chain encircling said first sprocket and composed of a plurality of successive, pivotally inter-connected, rigid links and rollers at the pivotal interconnections between successive links snugly engaging the recesses in the first sprocket, a second endless chain encircling said second sprocket and composed of a plurality of successive, pivotally interconnected, rigid links and rollers at the pivotal interconnections between said last-mentioned links snugly engaging the recesses in the second sprocket, means rigidly interconnecting said chains, and each roller in each chain having a bushing of rubber-like material which is deformable and resilient to accommodate shock loading and misalignment of the sprockets.

2. A double chain and sprocket coupling comprising:
   first and second rigid, separate, rotatable sprockets positioned axially adjacent each other and in approximate axial alignment, each sprocket having alternate teeth and rounded recesses around its periphery;
   a first endless chain in meshing engagement with said first sprocket throughout the latter's periphery, said first chain comprising
      a plurality of successive rigid links, each having spaced opposite side pieces disposed on opposite axial sides of the first sprocket, rigid cross pins pivotally interconnecting the successive links and extending across the rounded recesses in the periphery of the first sprocket, rigid cylindrical bushings directly attached to and extending between the opposite side pieces of alternate links and rotatably engaging said cross pins, and a roller on each said bushing snugly engaging the corresponding rounded recess in the first sprocket;
   a second endless chain in meshing engagement with said second sprocket throughout the latter's periphery, said second chain comprising
      a plurality of successive rigid links, each having spaced opposite side pieces disposed on opposite axial sides of the second sprocket, said rigid cross pins in the first chain extending across the rounded recesses in the periphery of the second sprocket and pivotally interconnecting the successive links of the second chain, rigid cylindrical bushings directly attached to and extending between the opposite side pieces of alternate links in said second chain and rotatably engaging said cross pins, and a roller on each last-mentioned bushing snugly engaging the corresponding rounded recess in the second sprocket;
   each roller in each chain having a length less than the axial spacing between the adjacent opposite side pieces of the chain links, each said roller comprising a rubber-like bushing which is deformable and resilient to accommodate shock loading and misalignment of the sprockets.

3. The coupling of claim 2 wherein each roller consists of a cylindrical, rigid outer sleeve and said rubber-like bushing engaged between and contacting said sleeve and the respective rigid bushing on the respective cross pin.

4. A double chain and sprocket coupling comprising:
   first and second rigid, separate, rotatable sprockets positioned axially adjacent each other and in approximate axial alignment, each sprocket having alternate teeth and rounded recesses around its periphery;
   a first endless chain in meshing engagement with said first sprocket throughout the latter's periphery, said first chain comprising
      a plurality of successive rigid links, each having spaced opposite side pieces disposed on opposite axial sides of the first sprocket, rigid cross pins pivotally interconnecting the successive links and extending across the rounded recesses in the periphery of the first sprocket, rigid cylindrical bushings extending between the opposite side pieces of alternate links and rotatably receiving said cross pins, and a roller on each said bushing snugly engaging the corresponding rounded recess in the first sprocket;
   a second endless chain in meshing engagement with said second sprocket throughout the latter's periphery, said second chain comprising
      a plurality of successive rigid links, each having spaced opposite side pieces disposed on opposite axial sides of the second sprocket, said rigid cross pins in the first chain extending across the rounded recesses in the periphery of the second sprocket and pivotally interconnecting the successive links of the second chain, rigid cylindrical bushings extending between the opposite side pieces of alternate links in said second chain and rotatably receiving said cross pins, and a roller on each last-mentioned bushing snugly engaging the corresponding rounded recess in the second sprocket;
   each roller in each chain having a length less than the axial spacing between the adjacent opposite side pieces of the chain links, each roller consisting of a cylindrical, rigid, outer sleeve, a cylindrical, rigid inner metal sleeve disposed inside said outer sleeve and engaging the respective rigid bushing on the respective cross pin, and a rubber-like bushing engaged between said outer and inner sleeves, said bushing being deformable and resilient to accommodate shock loading and misalignment of the sprockets.

References Cited by the Examiner
UNITED STATES PATENTS
2,587,365   2/52   Mize _____ 64—19

FOREIGN PATENTS
483,669   4/38   Great Britain.

DON A. WAITE, *Primary Examiner.*